(12) United States Patent
Chen et al.

(10) Patent No.: US 11,656,691 B2
(45) Date of Patent: May 23, 2023

(54) TERMINAL DEVICE CONTROL METHOD AND TERMINAL DEVICE

(71) Applicant: HUAWEI TECHNOLOGIES CO., LTD., Shenzhen (CN)

(72) Inventors: Xiaoxiao Chen, Nanjing (CN); Hao Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/557,407

(22) Filed: Dec. 21, 2021

(65) Prior Publication Data

US 2022/0179502 A1 Jun. 9, 2022

Related U.S. Application Data

(63) Continuation of application No. 16/465,176, filed as application No. PCT/CN2017/075546 on Mar. 3, 2017, now Pat. No. 11,429,198.

(30) Foreign Application Priority Data

Nov. 30, 2016 (CN) .......................... 201611084566.2

(51) Int. Cl.
*G06F 3/03* (2006.01)
*G06F 1/16* (2006.01)
*G06F 3/14* (2006.01)

(52) U.S. Cl.
CPC .............. *G06F 3/03* (2013.01); *G06F 1/1652* (2013.01); *G06F 3/14* (2013.01)

(58) Field of Classification Search
CPC ............. G06F 1/1652; G06F 3/14; G06F 3/03
See application file for complete search history.

(56) References Cited

U.S. PATENT DOCUMENTS

| | | |
|---|---|---|
| 2010/0066643 A1 | 3/2010 | King et al. |
| 2013/0293453 A1 | 11/2013 | Hwang |
| 2013/0296000 A1 | 11/2013 | Park et al. |
| 2013/0300686 A1 | 11/2013 | Yoon et al. |
| 2014/0055702 A1 | 2/2014 | Park et al. |
| 2014/0125578 A1 | 5/2014 | Zhou |

(Continued)

FOREIGN PATENT DOCUMENTS

| | | |
|---|---|---|
| CN | 103384284 A | 11/2013 |
| CN | 103389865 A | 11/2013 |

(Continued)

*Primary Examiner* — Calvin C Ma
(74) *Attorney, Agent, or Firm* — Maier & Maier, PLLC

(57) ABSTRACT

Embodiments provide a terminal device control method and a terminal device. The method includes: when a bending behavior of a flexible display occurs, determining a bending parameter of the flexible display, where the bending parameter includes at least one of a bending time parameter, a bending location parameter, a bending direction parameter, and a bending degree parameter; and adjusting a user interface (UI) of the flexible display based on the bending parameter, or generating, based on the bending parameter, a command corresponding to a first application. According to the method provided in the embodiments, the bending behavior of the flexible display is abstracted as the bending parameter, and the bending parameter is used as input of the application. This manner can effectively improve user experience.

20 Claims, 3 Drawing Sheets

(56) References Cited

U.S. PATENT DOCUMENTS

| | | | |
|---|---|---|---|
| 2014/0285476 A1* | 9/2014 | Cho | G06F 1/1601 |
| | | | 345/204 |
| 2015/0009129 A1 | 1/2015 | Song et al. | |
| 2015/0169127 A1 | 6/2015 | Park et al. | |
| 2015/0193068 A1 | 7/2015 | Kim | |
| 2015/0301672 A1* | 10/2015 | Kim | G09G 3/035 |
| | | | 345/156 |
| 2016/0048170 A1 | 2/2016 | Kim et al. | |
| 2016/0188079 A1 | 6/2016 | Xu | |

FOREIGN PATENT DOCUMENTS

| | | |
|---|---|---|
| CN | 104423553 A | 3/2015 |
| CN | 105047085 A | 11/2015 |

\* cited by examiner

TERMINAL DEVICE CONTROL METHOD AND TERMINAL DEVICE

CROSS-REFERENCE TO RELATED APPLICATIONS

This application is a continuation of U.S. patent application Ser. No. 16/465,176, filed on May 30, 2019, which is a National Stage of International Application No. PCT/CN2017/075546, filed on Mar. 3, 2017, which claims priority to Chinese Patent Application No. 201611084566.2, filed on Nov. 30, 2016. All of the aforementioned applications are hereby incorporated by reference in their entireties.

TECHNICAL FIELD

Embodiments relate to the communications field, and more specifically, to a terminal device control method and a terminal device.

BACKGROUND

A flexible display has special attributes such as flexibility and elasticity, and brings new experience to display. Currently, the flexible display is increasingly widely concerned and used. Some flexible handheld devices gradually enter the industry.

The prior art shows in detail how to construct a flexible display device and even a display apparatus and solution in which a flexible display and a rigid display are combined.

However, the prior art focuses on how to perform some new display based on a flexible display, but there is no better improvement in controlling a terminal device that is equipped with a flexible display, for example, human computer interaction.

SUMMARY

Embodiments provide a terminal device control method and a terminal device, to effectively improve user experience.

According to a first aspect, a terminal device control method is provided, and the method includes:

when a bending behavior of a flexible display occurs, determining a bending parameter of the flexible display, where the bending parameter includes at least one of a bending time parameter, a bending location parameter, a bending direction parameter, and a bending degree parameter, the bending time parameter is used to indicate a time at which the bending behavior of the flexible display occurs, the bending location parameter is used to indicate a location at which the bending behavior of the flexible display occurs, the bending direction parameter is used to indicate a direction in which the bending behavior of the flexible display occurs, and the bending degree parameter is used to indicate a degree of the bending behavior of the flexible display; and adjusting a user interface (UI) of the flexible display based on the bending parameter, or generating, based on the bending parameter, a command corresponding to a first application.

According to the method provided in the embodiments, the bending behavior of the flexible display is abstracted as the bending parameter, and the bending parameter is used as input of the application. This manner can effectively improve user experience.

In some possible implementations, the adjusting a user interface (UI) of the flexible display based on the bending parameter includes: if it is determined, based on the bending parameter, that a UI at a first location of the flexible display is in an extruded state or in a stretched state, adjusting configuration information of the UI at the first location based on a distance parameter, where the distance parameter indicates a distance between the first location and the bending location of the flexible display.

In the embodiments, the terminal device adjusts the configuration information of the UI, and when the bending behavior of the flexible display occurs, content deformation and extrusion near the bending location of the flexible display can be avoided, to ensure a visual effect.

In addition, after the bending behavior occurs, a sight line of human eyes is not perpendicular to a part of the display, and different displays have different visual angles. In the embodiments, the configuration information of the UI is adjusted, so that a user obtains a natural visual effect regardless of a display location at which the user looks, and user experience is effectively improved.

In some possible implementations, the adjusting a user interface (UI) of the flexible display based on the bending parameter includes:

presenting the UI based on the bending parameter and first mapping relationship information, where the first mapping relationship information includes a correspondence between a plurality of bending parameters and a plurality of UIs.

In some possible implementations, the first mapping relationship information includes a correspondence between a plurality of bending direction parameters and a plurality of UIs, and the presenting the UI based on the bending parameter and first mapping relationship information includes:

presenting the UI based on the bending direction parameter and the first mapping relationship.

In some possible implementations, before the generating, based on the bending parameter, a command corresponding to a first application, the method further includes:

sending the bending parameter to at least one application, where the at least one application includes the first application; and the generating, based on the bending parameter, a command corresponding to a first application includes:

generating, based on the bending parameter and a second mapping relationship, the command corresponding to the first application.

In some possible implementations, the second mapping relationship includes a correspondence between a plurality of bending parameters and a plurality of applications, and the generating, based on the bending parameter, a command corresponding to a first application includes:

generating a triggering command of the first application based on the bending parameter and the second mapping relationship information.

In some possible implementations, the second mapping relationship includes a correspondence between a plurality of bending parameters and a plurality of commands of the first application, and the generating, based on the bending parameter, a command corresponding to a first application includes:

generating, based on the bending parameter and the second mapping relationship information, a first command corresponding to the first application.

In some possible implementations, before the determining a bending parameter of the flexible display, the method further includes:

obtaining force distribution information of the flexible display and/or capacitance distribution information of the flexible display; and the determining a bending parameter of the flexible display includes:

determining the bending parameter based on the force distribution information and/or the capacitance distribution information.

In some possible implementations, the determining a bending parameter of the flexible display includes:

measuring a relative location between a first rigid display and a second rigid display by using a first sensor, where the flexible display is located between the first rigid display and the second rigid display, and hardness of each rigid display is greater than hardness of the flexible display; and determining the bending parameter based on the relative location.

In some possible implementations, the obtaining force distribution information of the flexible display and/or capacitance distribution information of the flexible display includes: determining the force distribution information by measuring a physical circuit of the flexible display, or determining the force distribution information by using a force sensor.

In some possible implementations, the obtaining force distribution information of the flexible display and/or capacitance distribution information of the flexible display includes: determining the capacitance value distribution information by using a capacitor.

According to a second aspect, a terminal device is provided, and the terminal device includes:

a determining unit, configured to: when a bending behavior of a flexible display occurs, determine a bending parameter of the flexible display, where the bending parameter includes at least one of a bending time parameter, a bending location parameter, a bending direction parameter, and a bending degree parameter, the bending time parameter is used to indicate a time at which the bending behavior of the flexible display occurs, the bending location parameter is used to indicate a location at which the bending behavior of the flexible display occurs, the bending direction parameter is used to indicate a direction in which the bending behavior of the flexible display occurs, and the bending degree parameter is used to indicate a degree of the bending behavior of the flexible display; and a processing unit, configured to: adjust a user interface (UI) of the flexible display based on the bending parameter, or generate, based on the bending parameter, a command corresponding to a first application.

According to a third aspect, a terminal device is provided, and the terminal device includes a processor. The processor is configured to:

when a bending behavior of a flexible display occurs, determine a bending parameter of the flexible display, where the bending parameter includes at least one of a bending time parameter, a bending location parameter, a bending direction parameter, and a bending degree parameter, the bending time parameter is used to indicate a time at which the bending behavior of the flexible display occurs, the bending location parameter is used to indicate a location at which the bending behavior of the flexible display occurs, the bending direction parameter is used to indicate a direction in which the bending behavior of the flexible display occurs, and the bending degree parameter is used to indicate a degree of the bending behavior of the flexible display; and adjust a user interface (UI) of the flexible display based on the bending parameter, or generate, based on the bending parameter, a command corresponding to a first application.

It should be noted that the terminal devices in the second aspect and the third aspect can implement/perform the method embodiment in the first aspect.

According to a fourth aspect, a processor is provided, and the processor is configured to:

when a bending behavior of a flexible display occurs, determine a bending parameter of the flexible display, where the bending parameter includes at least one of a bending time parameter, a bending location parameter, a bending direction parameter, and a bending degree parameter, the bending time parameter is used to indicate a time at which the bending behavior of the flexible display occurs, the bending location parameter is used to indicate a location at which the bending behavior of the flexible display occurs, the bending direction parameter is used to indicate a direction in which the bending behavior of the flexible display occurs, and the bending degree parameter is used to indicate a degree of the bending behavior of the flexible display; and adjust a user interface (UI) of the flexible display based on the bending parameter, or generate, based on the bending parameter, a command corresponding to a first application.

It should be noted that the processor in the fourth aspect can implement/perform the method embodiment in the first aspect.

According to a fifth aspect, a storage medium is provided, and the storage medium is configured to store a bending parameter of a flexible display, where the bending parameter includes at least one of a bending time parameter, a bending location parameter, a bending direction parameter, and a bending degree parameter.

In some possible implementations, the storage medium is further configured to store a command corresponding to a first application.

With reference to the foregoing aspects, in some possible implementations, the first application is a game application.

With reference to the foregoing aspects, in some possible implementations, the first sensor is an optical sensor, or the first sensor is a distance sensor.

DETAILED DESCRIPTION OF THE EMBODIMENTS

A terminal device control method in the embodiments is applicable to any terminal device that is equipped with a flexible display. The flexible display may implement a specific degree of flexible folding. For example, the flexible display may be a display apparatus including only a flexible display, or a display apparatus including a combination of a flexible display and a rigid display. Hardness of the rigid display is greater than hardness of the flexible display.

The following describes the terminal device control method and a terminal device in the embodiments with reference to the accompanying drawings.

Figure 1:
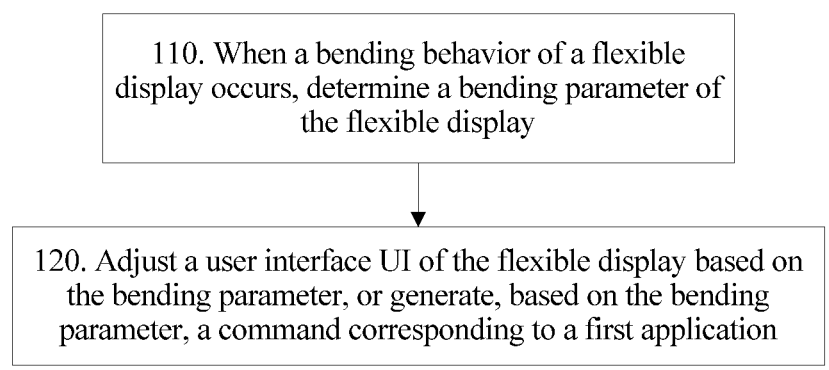
FIG. 1 is a schematic flowchart of a terminal device control method according to an embodiment.

FIG. 1 is a schematic flowchart of a terminal device control method 100 according to an embodiment. The method 100 may be performed by a terminal device or may be performed by a processor of the terminal device. For ease of description, the following performs description by using an example in which the terminal device is an execution body.

110. When a bending behavior of a flexible display occurs, determine a bending parameter of the flexible display.

For example, a user may make one or more bending behaviors of the flexible display by using a physical operation. When the bending behavior of the flexible display occurs, the terminal device determines the bending parameter of the flexible display.

In this embodiment, the bending parameter may include at least one of a bending time parameter, a bending location parameter, a bending direction parameter, and a bending degree parameter. The bending time parameter is used to indicate a time at which the bending behavior of the flexible display occurs, the bending location parameter is used to indicate a location at which the bending behavior of the flexible display occurs, the bending direction parameter is used to indicate a direction in which the bending behavior of the flexible display occurs, and the bending degree parameter is used to indicate a degree of the bending behavior of the flexible display. The bending parameter may be parameters in various forms or various parameters that are used to indicate the bending behavior.

For example, the bending time parameter may be a recorded time at which the bending behavior of the flexible display occurs, for example, 00:00:00 on Jan. 1, 2017.

Figure 2:
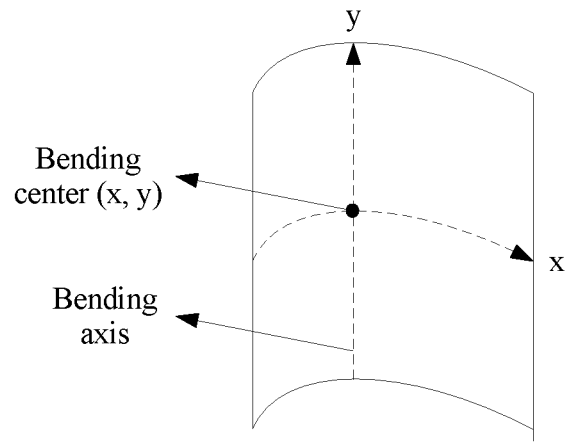
FIG. 2 is a schematic block diagram of a bending parameter according to an embodiment.

For another example, as shown in FIG. 2, the bending location parameter is described by using a plane rectangular coordinate system. Optionally, the bending location parameter may be represented by using a bending center and/or a bending axis. The bending center is a most convex location or a most concave location on the flexible display when the bending behavior of the flexible display occurs. The bending axis is a waveform curve generated on the flexible display when the bending behavior of the flexible display occurs. In this embodiment, a line including points whose curvature is zero on the waveform curve is defined as the bending axis. The bending axis may also be referred to as a bump axis.

For example, when the bending behavior of the flexible display does not occur, coordinates (x,y) are used to indicate locations on the flexible display. When the bending behavior of the flexible display occurs, coordinates corresponding to the most concave location or the most convex location or coordinates corresponding to the most convex location are used as the bending location parameter, for example, (2, 3). Alternatively, a straight line or a curve including points whose curvature is zero is used as the bending location parameter, for example, x=1, or y=4x.

For another example, the bending location parameter of the flexible display may be described with reference to the coordinates of the most concave location or the coordinates of the most convex location and the bending axis.

It should be noted that each bending behavior of the flexible display has a direction. In one direction, the flexible display is bent towards a display surface, and in another possible direction, the flexible display is bent towards a non-display surface. Bending towards the display surface may also be referred to as inward bending. This indicates that the display surface of the flexible display is in a concave shape. Bending towards the non-display surface may also be referred to as outward bending. This indicates that the display surface of the flexible display is in a convex shape.

Optionally, in this embodiment, the bending direction parameter may be identified by using a numerical value. For example, the bending towards the display surface may be specifically represented by using 0, and the bending towards the non-display surface may be specifically represented by using 1.

It should be further noted that the bending degree parameter in this embodiment is used to indicate a bending degree of the flexible display when the bending behavior of the flexible display occurs, and is used to indicate strength of force currently applied on the flexible display by a user or another device. Optionally, a floating point or an integer value may be used to represent a value of the strength. A larger absolute value of the value indicates a higher degree of bending, for example, 80, 28, 93, or 200.

It should be understood that the bending parameters in this embodiment may be in another form or may be combined with each other for description, provided that the terminal device can identify the bending parameters. This is not limited in this embodiment.

For example, the bending degree parameter and the bending direction parameter may be combined for description. Optionally, a positive number or a negative number may be used to represent a bending direction and a bending degree. For example, −200 indicates that a degree of bending towards the non-display surface is 200, and 101 indicates that a degree of bending towards the display surface is 101.

An example of a parameter existing when the bending behavior of the flexible display occurs is described above by using the bending location parameter, the bending direction parameter, and the bending degree parameter. This is not specifically limited in this embodiment.

The following describes specific implementations of obtaining the bending parameters.

In an embodiment, the terminal device is equipped with only the flexible display.

Optionally, force distribution information of the flexible display is determined, and the bending parameter is determined based on the force distribution information.

For example, the force distribution information is determined by measuring a physical circuit of the flexible display, or the force distribution information is determined by using a force sensor. For example, when it is determined, through measurement by using the force sensor, that a location corresponding to coordinates (2, 3) on the flexible display bears maximum force, and a force value is 20 Newton (N), the bending location parameter of the flexible display is determined as (2, 3), and the bending degree parameter of the flexible display is determined as 20 (N).

Optionally, capacitance distribution information of the flexible display is determined, and the bending parameter is determined based on the capacitance distribution information. Specifically, in an electronic line or an electric appliance line, capacitance not only exists in a capacitor, but also exists between any two power-on conductors. For example, capacitance exists between power transmission lines, between a transmission line and the ground, between pins of a transistor, and between elements. In this embodiment, distribution of the capacitance is referred to as capacitance distribution information. When the bending behavior of the flexible display occurs, capacitance distribution at a bending part is denser, and a capacitance value of the bending part is more regular compared with that of another area. The terminal device determines the bending parameter based on the capacitance distribution information existing when the bending behavior of the flexible display occurs.

For example, the capacitance value distribution information is determined by using a capacitor. In this example, and according to the information obtained through measurement by using the capacitor, coordinates of a location or an axis at which capacitance value distribution is densest is determined as the bending location parameter.

For example, when the bending behavior of the flexible display does not occur, a coordinate system of the flexible display is determined by using a center point of the flexible display as an origin, using a horizontal as an x-axis, and using a vertical as a y-axis. When the bending behavior of the flexible display occurs, and the terminal device determines, by using the capacitor, that capacitance value distribution at a location corresponding to x=4 is densest, the bending location parameter is determined as x=4.

In another embodiment, the terminal device is equipped with the flexible display and a rigid display.

Optionally, a relative location between a first rigid display and a second rigid display is measured by using a first sensor, the flexible display is located between the first rigid display and the second rigid display, and hardness of each rigid display is greater than hardness of the flexible display; and the bending parameter is determined based on the relative location.

It should be understood that the first sensor may be an optical sensor or may be a distance sensor. Alternatively, the first sensor may be another sensor that can detect a distance. It should be further understood that the terminal device in this embodiment may be equipped with a plurality of rigid displays.

It should be further understood that the foregoing embodiment of determining the bending parameter is merely an example. This embodiment is not limited thereto. For example, the terminal device may alternatively flexibly obtain the bending parameter based on physical implementation of the flexible display.

120. Adjust a user interface (UI) of the flexible display based on the bending parameter, or generate, based on the bending parameter, a command corresponding to a first application.

For example, the terminal device adjusts the UI of the flexible display based on the bending parameter abstracted from the bending behavior, or generates, based on the bending parameter, the command corresponding to the first application.

It should be noted that an intelligent operating system such as an Android intelligent operating system performs page rendering and generation based on system resolution, a size of a UI layer, a location of the UI layer, and a resource in the UI layer.

In an embodiment, when the bending behavior of the flexible display occurs, to ensure UI quality and improve user experience, the bending parameter may be used as one of bases for generating page content.

In other words, after the user performs the physical operation on the flexible display, the terminal device can adjust the user interface based on the obtained bending parameter.

For example, when the user bends the display towards the display surface, a display element near a location of the bending axis may be appropriately adjusted, so that the display element has a pantoscopic visual effect similar to that of a curved display, instead of maintaining an original layout of a straight display, where the original layout causes content deformation and extrusion near the bending axis.

Similarly, after the bending behavior occurs, a sight line of human eyes is not perpendicular to a part of the display, and different displays have different visual angles. Therefore, some intelligent rendering adjustments may be performed, so that the user obtains a natural visual effect regardless of a display location at which the user looks.

Optionally, in this embodiment, if it is determined, based on the bending parameter, that a UI at a first location of the flexible display is in an extruded state or in a stretched state, configuration information of the UI at the first location is adjusted based on a distance parameter. The distance parameter is a distance between the first location and the bending location of the flexible display.

For example, if it is determined, based on the bending parameter, that content displayed at the bending location is extruded, content closer to the bending axis is extruded severer, and content farther away from the bending axis has greater visual deviation, assuming that a distance between the first location and the bending axis is d, an adjustment degree of a display element in the configuration information of the UI is inversely proportional to d. An adjustment direction is appropriate dispersion, to compensate for a visual extrusion effect, and implement a better circular-screen visual effect. An adjustment degree of a rendering element in the configuration information of the UI is proportional to d. Angle of view adjustment and degree of inclination adjustment are performed on the rendering element, to implement a better effect. The terminal device may specifically adjust an angle of view and a degree of inclination of the rendering element.

For example, the adjustment degree of the display element in the configuration information of the UI may be adjusted based on a formula $Y=-(1/d)$, where y is the adjustment degree of the display element in the configuration information of the UI, d is the distance between the first location and the bending axis, and a symbol "−" indicates that the adjustment direction is appropriate dispersion.

From a perspective of the user, the user performs a physical operation of bending the flexible display towards the display surface, in other words, the display surface of the flexible display is relatively bent, displayed content is in the extruded state on the flexible display, content closer to the bending axis is extruded severer, and content farther away from the bending axis has greater visual deviation.

In this embodiment, the physical operation of the user is quantized by using the bending parameter, and the bending parameter is used as a reference for adjusting the configuration information of the UI. For example, if the bending location of the flexible display is determined as coordinates (0, 0) of an origin, the coordinates of the origin are used as a center, and an adjustment degree of a display element in the configuration information of the UI at coordinates (x,y) is inversely proportional to a distance between the coordinates (x,y) and the coordinates (0, 0). Therefore, even if the user performs the physical operation of bending the flexible display, the user obtains a natural visual effect regardless of a display location at which the user looks.

For another example, if it is determined, based on the bending parameter, that content displayed at the bending location is dispersed, content closer to the bending axis is dispersed severer, and content farther away from the bending axis has greater visual deviation, assuming that a distance between the first location and the bending axis is d, an adjustment degree of a display element in the configuration information of the UI is inversely proportional to d. An adjustment direction is appropriate extrusion, to compensate for a visual dispersion effect, and implement a better circular-screen visual effect. An adjustment degree of a rendering element in the configuration information of the UI is proportional to d, to implement a better effect.

For example, the adjustment degree of the display element in the configuration information of the UI may be adjusted based on a formula $Y=+(1/d)$, where y is the adjustment degree of the display element in the configuration information of the UI, d is the distance between the first location and the bending axis, and a symbol "+" indicates that the adjustment direction is appropriate extrusion.

Optionally, in this embodiment, a first mapping relationship between a plurality of bending parameters and a plurality of UIs may be further established, and the UI is presented based on the bending parameter and the first mapping relationship information.

For example, the first mapping relationship information includes a correspondence between a plurality of bending direction parameters and a plurality of UIs, and the UI is presented based on the bending direction parameter and the first mapping relationship.

Additionally, for example, a first UI is presented in a first bending direction, and a second UI is presented in a second bending direction.

In an example, if the user performs the physical operation of bending the flexible display towards the display surface, that is, the flexible display presents the first UI, a display element in the first UI is appropriately dispersed. If the user performs a physical operation of bending the flexible display towards the non-display surface, that is, the flexible display presents the second UI, a display element in the second UI is appropriately converged. However, from the perspective of the user, even if the user performs the physical operation of bending the flexible display, the user obtains a natural visual effect regardless of a display location at which the user looks.

It should be understood that application of intelligently adjusting a UI layout and a visual effect is merely an example description. In the terminal device control method in this embodiment, other information in the configuration information of the UI may be further adjusted based on the bending parameter. This is not limited in this embodiment.

In another embodiment, the terminal device may associate the bending parameter with an application command. For example, the terminal device may generate, based on the bending parameter, the command corresponding to the first application.

Optionally, before the command corresponding to the first application is generated based on the bending parameter, the bending parameter is sent to at least one application, where the at least one application includes the first application; and the command corresponding to the first application is generated based on the bending parameter and a second mapping relationship.

For example, the terminal device sends the bending parameter to the at least one application. When the first application in the at least one application receives the bending parameter, the first application can generate a specific operation command based on the second mapping relationship. In other words, in this embodiment, the bending behavior of the user is associated with the operation command of the application.

Optionally, the second mapping relationship includes a correspondence between a plurality of bending parameters and a plurality of applications, and a triggering command of the first application is generated based on the bending parameter and the second mapping relationship information.

For example, the first application is triggered at a first bending location, and a second application is triggered at a second bending location.

From the perspective of the user, the terminal device may generate a corresponding specific command based on the bending location parameter of the flexible display. For example, it is assumed that the user performs the physical operation of bending the flexible display towards the display surface or performs the physical operation of bending the flexible display towards the non-display surface. If the terminal device detects that a location indicated by the bending location parameter is a location of a WeChat icon, a WeChat application is started. If the terminal device detects that the location indicated by the bending location parameter is a location of a QQ icon, a QQ application is started.

Optionally, the second mapping relationship includes a correspondence between a plurality of bending parameters and a plurality of commands of the first application, and a first command corresponding to the first application is generated based on the bending parameter and the second mapping relationship information.

In other words, different bending parameters may be corresponding to different operation commands of a same application.

Optionally, the bending parameter is sent to at least one application, and the at least one application includes the first application, so that the first application generates, based on the bending parameter, the command corresponding to the first application.

From the perspective of the user, the terminal device may generate a corresponding specific command based on the bending parameter of the flexible display. For example, it is assumed that the user performs the physical operation of bending the flexible display towards the display surface or performs the physical operation of bending the flexible display towards the non-display surface.

If a degree of user's force is less than a first threshold, and a detected bending degree parameter is less than 20, the first application is started. If the degree of user's force is greater than the first threshold and less than a second threshold, and the detected bending degree parameter is greater than 20 and less than 30, an application introduction interface of the first application is started. The second threshold is greater than the first threshold. If the degree of user's force is greater than the second threshold, and the detected bending degree parameter is greater than 30, an exit command of the first application is started.

For example, the first application is a game application. The terminal device may define an elastic input event for a game based on the bending parameter, to improve interest of the game and the application. For example, an elastic behavior of the flexible display may be used to execute a slingshot behavior of the Angry Birds.

In an example, the bending degree parameter may be directly used as a bending degree parameter of a slingshot.

It should be understood that the first application in this embodiment may be a game, or may be any other application that is configured with a human computer interaction function related to the flexible display. In other words, the first application may be any application that has a human computer interaction event of the flexible display. This is not limited in this embodiment. In addition, for ease of description, the human computer interaction event of the flexible display is referred to as a human computer interaction event for short below.

An embodiment provides a new method that is for a human computer interaction event and that is defined based on a bending behavior of a flexible display, to bring a new operation manner to an application and a game. In addition, a display layout may be more intelligently adjusted by using the behavior, to implement a better visual effect.

Figure 3:
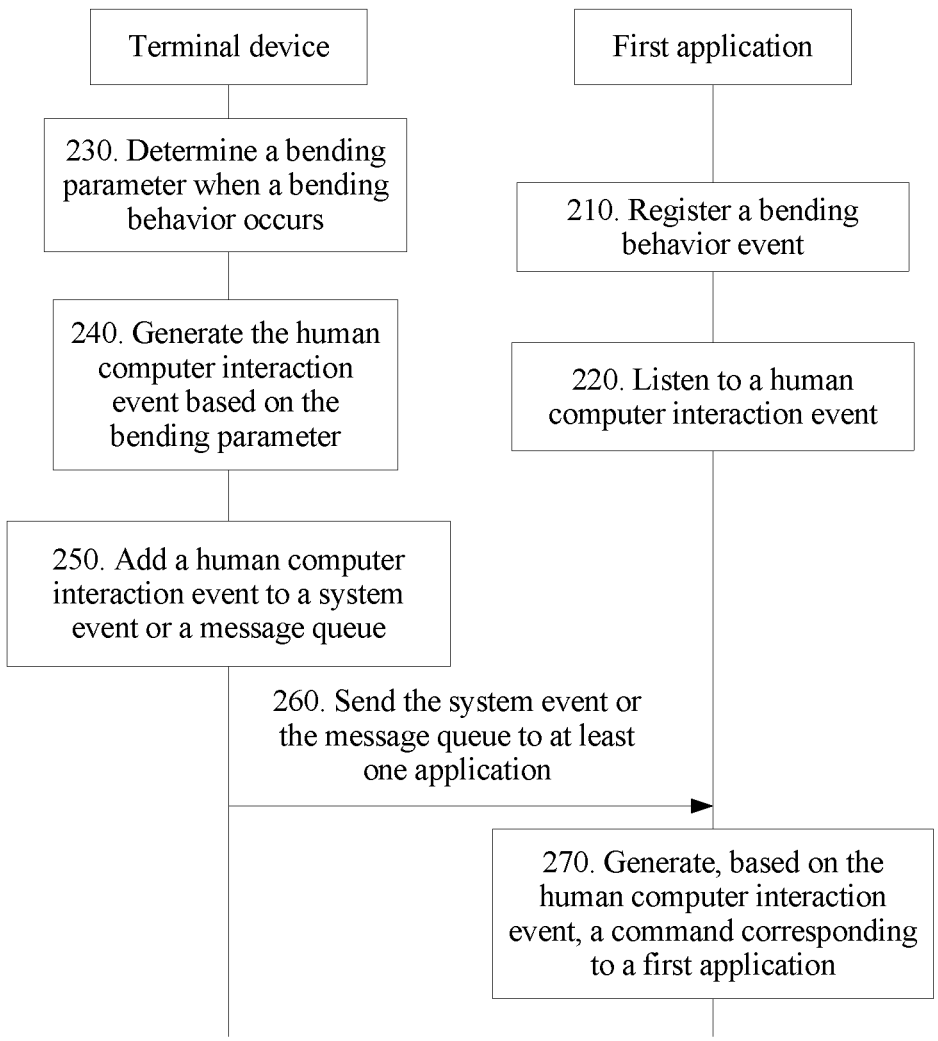
FIG. 3 is another schematic flowchart of a terminal device control method according to an embodiment.

FIG. 3 is a schematic flowchart of a terminal device control method 200 according to an embodiment.

210. Register a bending behavior event.

For example, an application in a terminal device is registered by using an interface or a method that is for registering a human computer interaction event and that is provided by a system, so that a subsequent human computer interaction event sent by the system may be listened to.

220. Listen to a human computer interaction event.

For example, an application that has a human computer interaction function in the terminal device is equipped with a bending behavior listener. The bending behavior listener always listens to a system event that includes a human computer interaction event. After an event of F=FLEXURAL_EVENT is detected through listening, a bending parameter existing when a bending behavior of a flexible display occurs is obtained through parsing.

230. Determine a bending parameter when a bending behavior occurs.

For example, a user bends the terminal device of the flexible display. To avoid repetition, details are not described herein again.

240. Generate the human computer interaction event based on the bending parameter.

For example, after the physical bending behavior of the flexible display is converted into a digital parameter, a format conversion is further performed, such as the bending parameter is converted into a parameter in a data format of the human computer interaction event. Optionally, the following format is used:

[Event flag type F: Parameter P]

The event flag type F represents a flag for differentiating the event from another event (for example, a touch event, or an incoming call event) of the system. The flag is a system-level flag. For any application that obtains an event sent by the system, the application may determine, by using the event flag type F, whether the event is the human computer interaction event of the flexible display. In this embodiment, F=FLEXURAL_EVENT is used as an example for description. Definition of the flag is not limited to this name. The parameter P represents a parameter carried in the human computer interaction event and is a data structure.

For example, the parameter P may include the following information:

[A quantity N of bending behaviors, a bending behavior ID1, a time at which the bending behavior 1 occurs, a bending axis location of the bending behavior 1, a bending degree of the bending behavior 1, and information about another extension standby field of the bending behavior 1;

a bending behavior ID2, a time at which the bending behavior 2 occurs, a bending axis location of the bending behavior 2, a bending degree of the bending behavior 2, and information about another extension standby field of the bending behavior 2;

a bending behavior IDN, a time at which the bending behavior N occurs, a bending axis location of the bending behavior N, a bending degree of the bending behavior N, and information about another extension standby field of the bending behavior N.]

The quantity N of bending behaviors indicates a quantity of bending behaviors on the flexible display in a current state. Each bending behavior includes information such as an ID of the bending behavior, a time at which the bending behavior occurs, a location of the bending behavior, and a degree of the bending behavior. The field "information about another extension standby field of a bending behavior i" is an extension field, which allows the system to retain an extension capability. A plurality of extension fields may be set for technology evolution.

It should be understood that the data format and the parameter P of the human computer interaction event are merely examples. This is not limited in this embodiment.

250. Add a human computer interaction event to a system event or a message queue.

For example, after the human computer interaction event is generated, the terminal device adds the human computer interaction event to the system message queue, so that the human computer interaction event joins the message sending queue. Optionally, the queue complies with an original priority or queuing rule of the system.

260. Send the system event or the message queue to at least one application.

For example, when it is the turn of the human computer interaction event to be sent in the queue, the human computer interaction event may be sent by using a system event sending mechanism. Optionally, the human computer interaction event is sent in a broadcast manner. In an example, the terminal device searches for all applications registered for listening to a human computer interaction event, and broadcasts the human computer interaction event (including a parameter) to the applications.

270. Generate, based on the human computer interaction event, a command corresponding to a first application.

In an example, after data is obtained through parsing, the application processes the data based on a requirement of the application. To avoid repetition, details are not described herein again.

Figure 4:
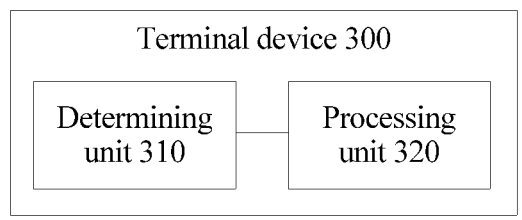
FIG. 4 is a schematic block diagram of a terminal device according to an embodiment.
Figure 5:
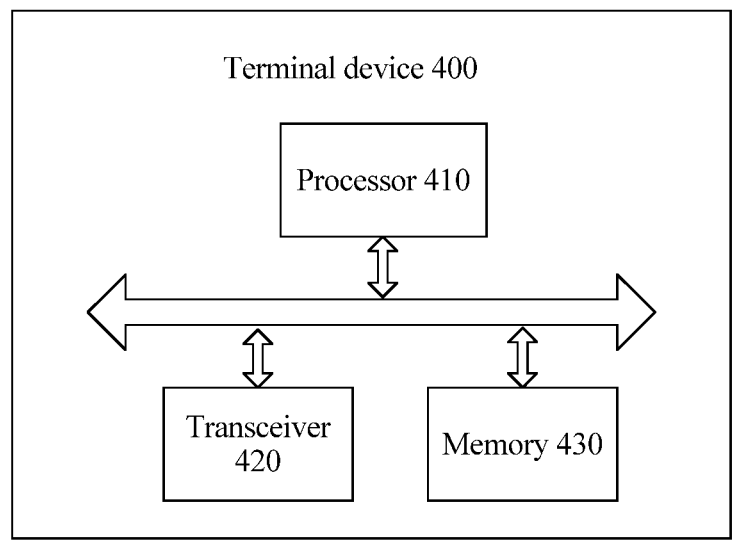
FIG. 5 is another schematic block diagram of a terminal device according to an embodiment.

The following describes the terminal device in the embodiments with reference to FIG. 4 and FIG. 5.

FIG. 4 is a schematic block diagram of a terminal device 300 according to an embodiment.

As shown in FIG. 4, the terminal device 300 includes:

a determining unit 310, configured to: when a bending behavior of a flexible display occurs, determine a bending parameter of the flexible display, where the bending parameter includes at least one of a bending time parameter, a bending location parameter, a bending direction parameter, and a bending degree parameter, the bending time parameter is used to indicate a time at which the bending behavior of the flexible display occurs, the bending location parameter is used to indicate a location at which the bending behavior of the flexible display occurs, the bending direction parameter is used to indicate a direction in which the bending behavior of the flexible display occurs, and the bending degree parameter is used to indicate a degree of the bending behavior of the flexible display; and a processing unit 320, configured to: adjust a user interface (UI) of the flexible display based on the bending parameter, or generate, based on the bending parameter, a command corresponding to a first application.

Optionally, the processing unit 320 is configured to:

if it is determined, based on the bending parameter, that a UI at a first location of the flexible display is in an extruded state or in a stretched state, adjust configuration information of the UI at the first location based on a distance parameter, where the distance parameter indicates a distance between the first location and the bending location of the flexible display.

Optionally, the processing unit 320 is configured to:

present the UI based on the bending parameter and first mapping relationship information, where the first mapping relationship information includes a correspondence between a plurality of bending parameters and a plurality of UIs.

Optionally, the first mapping relationship information includes a correspondence between a plurality of bending direction parameters and a plurality of UIs, and the processing unit 320 is configured to:

present the UI based on the bending direction parameter and the first mapping relationship.

Optionally, the terminal device further includes:

a transceiver unit, configured to: before the processing unit 320 generates, based on the bending parameter, the command corresponding to the first application, send the bending parameter to at least one application. The at least one application includes the first application. The processing unit 320 is specifically configured to:

generate, based on the bending parameter and a second mapping relationship, the command corresponding to the first application.

Optionally, the second mapping relationship includes a correspondence between a plurality of bending parameters and a plurality of applications, and the processing unit 320 is configured to:

generate a triggering command of the first application based on the bending parameter and the second mapping relationship information.

Optionally, the second mapping relationship includes a correspondence between a plurality of bending parameters and a plurality of commands of the first application, and the processing unit 320 is configured to:

generate, based on the bending parameter and the second mapping relationship information, a first command corresponding to the first application.

Optionally, the transceiver unit is further configured to:

before the determining unit 310 determines the bending parameter of the flexible display, obtain force distribution information of the flexible display and/or capacitance distribution information of the flexible display. The determining unit 310 is configured to:

determine the bending parameter based on the force distribution information and/or the capacitance distribution information.

Optionally, the determining unit 310 is configured to:

measure a relative location between a first rigid display and a second rigid display by using a first sensor, where the flexible display is located between the first rigid display and the second rigid display, and hardness of each rigid display is greater than hardness of the flexible display; and determine the bending parameter based on the relative location.

Optionally, the determining unit 310 is configured to: determine force distribution information of the flexible display, and determine the bending parameter based on the force distribution information.

Optionally, the determining unit 310 is configured to: determine the force distribution information by measuring a physical circuit of the flexible display or determine the force distribution information by using a force sensor.

Optionally, the determining unit 310 is configured to: determine capacitance distribution information of the flexible display, and determine the bending parameter based on the capacitance distribution information.

Optionally, the determining unit 310 is configured to determine the capacitance value distribution information by using a capacitor.

Optionally, the first sensor is an optical sensor, or the first sensor is a distance sensor.

It should be noted that, in this embodiment, both the determining unit 310 and the processing unit 320 may be implemented by a processor.

As shown in FIG. 5, an apparatus 400 may include a processor 410, a transceiver 420, and a memory 430. The memory 430 may be configured to store indication information, and may be further configured to store code, an instruction, and the like that are executed by the processor 410. All components of the apparatus 400 are connected by using a bus system. In addition to a data bus, the bus system further includes a power bus, a control bus, and a status signal bus.

In an example, the processor 410 is configured to:

when a bending behavior of a flexible display occurs, determine a bending parameter of the flexible display, where the bending parameter includes at least one of a bending time parameter, a bending location parameter, a bending direction parameter, and a bending degree parameter, the bending time parameter is used to indicate a time at which the bending behavior of the flexible display occurs, the bending location parameter is used to indicate a location at which the bending behavior of the flexible display occurs, the bending direction parameter is used to indicate a direction in which the bending behavior of the flexible display occurs, and the bending degree parameter is used to indicate a degree of the bending behavior of the flexible display; and adjust a user interface (UI) of the flexible display based on the bending parameter, or generate, based on the bending parameter, a command corresponding to a first application.

Optionally, the processor 410 is configured to:

if it is determined, based on the bending parameter, that a UI at a first location of the flexible display is in an extruded state or in a stretched state, adjust configuration information of the UI at the first location based on a distance parameter, where the distance parameter indicates a distance between the first location and the bending location of the flexible display.

Optionally, the processor 410 is configured to:

present the UI based on the bending parameter and first mapping relationship information, where the first mapping relationship information includes a correspondence between a plurality of bending parameters and a plurality of UIs.

Optionally, the first mapping relationship information includes a correspondence between a plurality of bending direction parameters and a plurality of UIs, and the processor 410 is configured to:

present the UI based on the bending direction parameter and the first mapping relationship.

Optionally, the terminal device further includes:

the transceiver 420, configured to: before the processor 410 generates, based on the bending parameter, the command corresponding to the first application, send the bending parameter to at least one application. The at least one application includes the first application. The processor 410 is configured to:

generate, based on the bending parameter and a second mapping relationship, the command corresponding to the first application.

Optionally, the second mapping relationship includes a correspondence between a plurality of bending parameters and a plurality of applications, and the processor 410 is configured to:

generate a triggering command of the first application based on the bending parameter and the second mapping relationship information.

Optionally, the second mapping relationship includes a correspondence between a plurality of bending parameters and a plurality of commands of the first application, and the processor 410 is specifically configured to:

generate, based on the bending parameter and the second mapping relationship information, a first command corresponding to the first application.

Optionally, the transceiver 420 is further configured to:

before the processor 410 determines the bending parameter of the flexible display, obtain force distribution information of the flexible display and/or capacitance distribution information of the flexible display. The processor 410 is specifically configured to:

determine the bending parameter based on the force distribution information and/or the capacitance distribution information.

Optionally, the processor 410 is configured to:

measure a relative location between a first rigid display and a second rigid display by using a first sensor, where the flexible display is located between the first rigid display and the second rigid display, and hardness of each rigid display is greater than hardness of the flexible display; and determine the bending parameter based on the relative location.

The apparatus 400 shown in FIG. 5 can implement processes in the foregoing method embodiments of FIG. 1 and FIG. 3. To avoid repetition, details are not described herein again.

Persons of ordinary skill in the art may be aware that the units and algorithm steps in the examples described with reference to the embodiments may be implemented by electronic hardware or a combination of computer software and electronic hardware. Whether the functions are performed by hardware or software depends on particular applications and design constraint conditions of the solutions. Persons of ordinary skill in the art may further use different methods to implement the described functions for each particular application, but it should not be considered that the implementation goes beyond the scope of the embodiments of the embodiments.

It may be clearly understood by persons of ordinary skill in the art that, for the purpose of convenient and brief description, for a detailed working process of the system, apparatus, and unit, refer to a corresponding process in the method embodiments. Details are not described herein again.

In the several embodiments provided in the embodiments, it should be understood that the system, apparatus, and method embodiments may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the embodiments.

In addition, each of the function units in embodiments may be integrated into a processing unit, or may exist alone physically, or two or more units are integrated into a unit.

When the functions are implemented in a form of a software functional unit and sold or used as an independent product, the functions may be stored in a computer-readable storage medium. Based on such an understanding, the solutions in the embodiments essentially, or the part contributing to the prior art, or some of the solutions may be implemented in a form of a software product. The software product is stored in a storage medium and includes several instructions for instructing a computer device (which may be a personal computer, a server, a network device, or the like) to perform all or some of the steps of the methods described in the embodiments. The storage medium includes any medium that can store program code, such as a USB flash drive, a removable hard disk, a read-only memory (ROM), a random access memory (RAM), a magnetic disk, or an optical disc.

The foregoing descriptions are merely implementations of the embodiments but should not be interpreted as limiting. Any variation or replacement readily figured out by persons of ordinary skill in the art within the scope disclosed in the embodiments shall fall within the scope of the embodiments.

What is claimed is:

1. A terminal device control method, wherein a terminal device is equipped with a flexible display, and the method comprises:

displaying a user interface (UI) of one application on the flexible display;

obtaining a bending parameter of the flexible display when a bending behavior of the flexible display occurs, wherein the bending parameter comprises a bending location parameter, wherein:

the bending location parameter indicates a bending location at which the bending behavior of the flexible display occurs; and adjusting the UI based on the bending location parameter to display an adjusted UI, wherein the adjusted UI spans the bending location.

2. The method according to claim 1, wherein adjusting the UI based on the bending parameter comprises:

if it is determined, based on the bending parameter, that a UI element at a first location of the flexible display is in an extruded state or in a stretched state, adjusting configuration information of the UI element at the first location based on a distance parameter, wherein the distance parameter indicates a distance between the first location and the bending location of the flexible display.

3. The method according to claim 1, wherein adjusting the UI based on the bending parameter comprises:

presenting the UI based on the bending parameter and first mapping relationship information, wherein the first mapping relationship information comprises a correspondence between a plurality of bending parameters and a plurality of UIs.

4. The method according to claim 1, wherein the generating, based on the bending parameter, of the command corresponding to the one application comprises: generating, based on the bending parameter and a second mapping relationship, the command corresponding to the one application.

5. The method according to claim 4, wherein the second mapping relationship comprises a correspondence between a plurality of bending parameters and a plurality of applications; and, wherein generating, based on the bending parameter, the command corresponding to the one application comprises: generating a triggering command of the one application based on the bending parameter and the second mapping relationship; or the second mapping relationship comprises a correspondence between a plurality of bending parameters and a plurality of commands of the one application; and, wherein generating, based on the bending parameter, the command corresponding to the one application comprises: generating, based on the bending parameter and the second mapping relationship, a first command corresponding to the one application.

6. The method according to claim 1, wherein before obtaining the bending parameter of the flexible display, the method further comprises:
   obtaining force distribution information of the flexible display and/or capacitance distribution information of the flexible display; and, wherein
   obtaining the bending parameter of the flexible display comprises:
   determining the bending parameter based on the force distribution information and/or the capacitance distribution information.

7. The method according to claim 1, wherein obtaining the bending parameter of the flexible display comprises:
   measuring a relative location between a first rigid display and a second rigid display by using a first sensor, wherein the flexible display is located between the first rigid display and the second rigid display, and hardness of each rigid display is greater than hardness of the flexible display; and
   determining the bending parameter based on the relative location.

8. The method according to claim 1, wherein, the UI is displayed by a system of the terminal device, the bending parameter of the flexible display is obtained by the system of the terminal device, and the adjusting of the UI based on the bending location parameter to display an adjusted UI comprises:
   sending, by the system of the terminal device, the bending parameter to the one application;
   receiving, by the system of the terminal device, the adjusted UI of the one application from the one application, wherein the adjusted UI of the one application is obtained by the one application based on the UI and the bending parameter; and
   displaying, by the system of the terminal device, the adjusted UI of the one application on the flexible display.

9. The method according to claim 1, the bending location parameter comprises coordinates of the bending location.

10. The method according to claim 1, wherein the adjusting of the UI based on the bending location parameter comprises: adjusting the UI of the flexible display based on a relative location relationship between a display element in the UI and the bending location indicated by the bending location parameter.

11. A terminal device, wherein the terminal device is equipped with a flexible display, and the terminal device comprises:
   a non-transitory computer readable medium which contains computer-executable instructions;
   a processor, wherein the processor is configured to execute the computer-executable instructions to enable the terminal device to:
   display a user interface (UI) of one application on the flexible display;
   obtain a bending parameter of the flexible display when a bending behavior of the flexible display occurs, wherein
   the bending parameter comprises a bending location parameter, wherein:
      the bending location parameter indicates a bending location at which the bending behavior of the flexible display occurs; and
   adjust the UI based on the bending location parameter to display an adjusted UI, wherein the adjusted UI spans the bending location.

12. The terminal device according to claim 11, wherein the processor is configured to execute the computer-executable instructions to enable the terminal device to:
   if it is determined, based on the bending parameter, that a UI element at a first location of the flexible display is in an extruded state or in a stretched state, adjust configuration information of the UI element at the first location based on a distance parameter, wherein the distance parameter indicates a distance between the first location and the bending location of the flexible display.

13. The terminal device according to claim 11, wherein the processor is configured to execute the computer-executable instructions to enable the terminal device to:
   present the UI based on the bending parameter and first mapping relationship information, wherein the first mapping relationship information comprises a correspondence between a plurality of bending parameters and a plurality of UIs.

14. The terminal device according to claim 11, wherein the processor is configured to execute the computer-executable instructions to enable the terminal device to:
   generate, based on the bending parameter and a second mapping relationship, the command corresponding to the one application.

15. The terminal device according to claim 14, wherein the second mapping relationship comprises a correspondence between a plurality of bending parameters and a plurality of applications; and the processor is configured to execute the computer-executable instructions to enable the terminal device to: generate a triggering command of the one application based on the bending parameter and the second mapping relationship information; or
   the second mapping relationship comprises a correspondence between a plurality of bending parameters and a plurality of commands of the one application; and the processor is configured to execute the computer-executable instructions to enable the terminal device to: generate, based on the bending parameter and the second mapping relationship information, a first command corresponding to the one application.

16. The terminal device according to claim 11, wherein the transceiver is further configured to:
   obtain force distribution information of the flexible display and/or capacitance distribution information of the flexible display; and
   the processor is configured to execute the computer-executable instructions to enable the terminal device to:
   determine the bending parameter based on the force distribution information and/or the capacitance distribution information.

17. The terminal device according to claim 11, wherein the processor is configured to execute the computer-executable instructions to enable the terminal device to:
   measure a relative location between a first rigid display and a second rigid display by using a first sensor, wherein the flexible display is located between the first rigid display and the second rigid display, and hardness of each rigid display is greater than hardness of the flexible display; and determine the bending parameter based on the relative location.

18. The terminal device according to claim 11, wherein the UI is displayed by a system of the terminal device, the bending parameter of the flexible display is obtained by the system of the terminal device, and the processor is configured to execute the computer-executable instructions to enable the system of the terminal device to:

send the bending parameter to the one application;

receive the adjusted UI of the one application from the one application, wherein the adjusted UI of the one application is obtained by the one application based on the UI and the bending parameter; and display the adjusted UI of the one application on the flexible display.

19. The terminal device according to claim 11, wherein the bending location parameter comprises coordinates of the bending location.

20. A non-transitory computer-readable storage medium comprising instructions which, when executed by a terminal, cause the terminal to:

display a user interface (UI) of one application on the flexible display;

obtain a bending parameter of the flexible display, wherein the bending parameter comprises a bending location parameter when a bending behavior of the flexible display occurs, wherein the bending location parameter indicates a bending location at which the bending behavior of the flexible display occurs; and adjust the UI based on the bending location parameter to display an adjusted UI, wherein the adjusted UI spans the bending location.

\* \* \* \* \*

UNITED STATES PATENT AND TRADEMARK OFFICE
CERTIFICATE OF CORRECTION

PATENT NO. : 11,656,691 B2  
APPLICATION NO. : 17/557407  
DATED : May 23, 2023  
INVENTOR(S) : Xiaoxiao Chen et al.

Page 1 of 1

It is certified that error appears in the above-identified patent and that said Letters Patent is hereby corrected as shown below:

In the Claims

On Column 16, "Claim 4", at Lines 53-55, please remove "wherein the generating, based on the bending parameter, of the command corresponding to the one application comprises:" and replace with "further comprising generating, based on the bending parameter, a command corresponding to the one application by:".

On Column 18, "Claim 14", at Lines 32-34, please remove "generate, based on the bending parameter and a second mapping relationship, the command" and replace with "generate, based on the bending parameter and a second mapping relationship, a command".

Signed and Sealed this  
Twelfth Day of November, 2024

Katherine Kelly Vidal  
*Director of the United States Patent and Trademark Office*